S. H. BRISBANE.
Scissors Gage.
No. 83,453.                                    Patented Oct. 27, 1868.
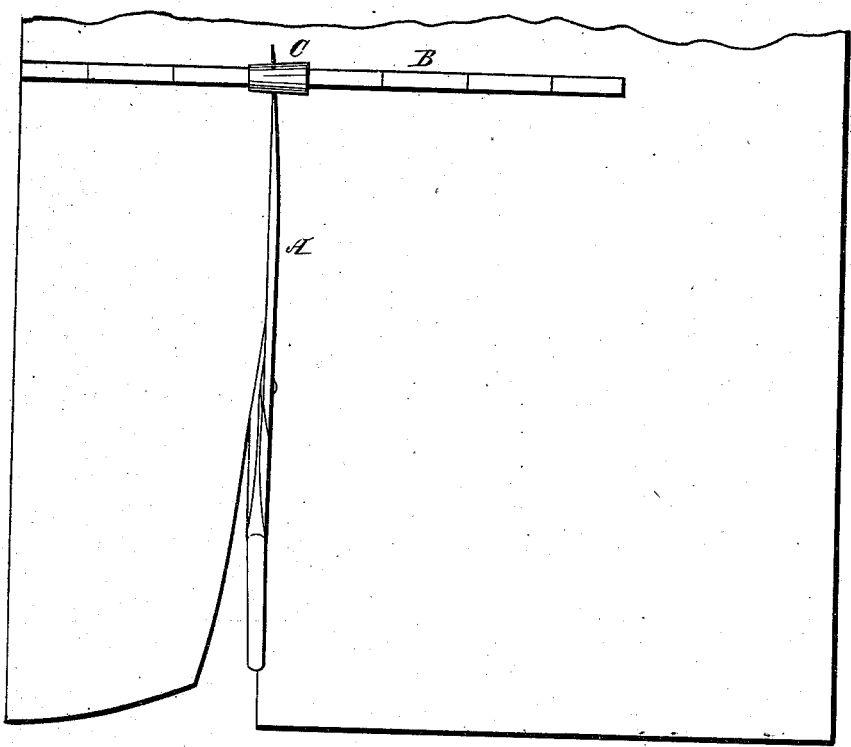
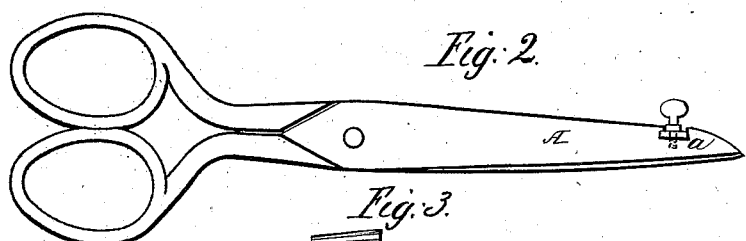
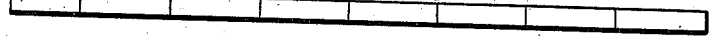

SARAH H. BRISBANE, OF FORDHAM, NEW YORK.

Letters Patent No. 83,453, dated October 27, 1868.

IMPROVEMENT IN SCISSORS.

The Schedule referred to in these Letters Patent and making part of the same.

*To all whom it may concern:*

Be it known that I, SARAH H. BRISBANE, of Fordham, in the county of Westchester, and State of New York, have invented a new and useful Improvement in Scissors; and I do hereby declare the following to be a full and correct description of the same, sufficient to enable others skilled in the art to which my invention appertains, to fully understand and construct the same, reference being had to the accompanying drawings, which make part of this specification, and in which—

Figure 1 is a perspective view of a pair of scissors in the act of cutting a piece of linen or cloth, with my improvement attached;

Figure 2 is a side elevation of the scissors; and

Figures 3 and 4 detached views of separate parts of my improvement.

Like letters of reference indicate like parts in the several figures.

The nature of my invention consists of the combination, with a common pair of scissors, of a gauge or measure, by means of which bands or strips of any desired width may be cut from any fabric, paper, &c., straight, with the edge of the same; and I accomplish this by providing one of the blades of a pair of scissors with a gauge, which may be secured to the same by any suitable means, so that the gauge or measure may be adjusted laterally at right angles with the blade.

In the drawings, I represent one mode of doing it.

Fig. 2 represents a pair of scissors, the blade A of which is provided on its back, near its point, with a bevelled slot, *a*, the lower width of which is such as to admit of a gauge or measure, B, fig. 4, being passed through it, without allowing the same to be taken out vertically. A bevelled wedge or key, C, fig. 3, is then passed into the slot, and by being pushed in as far as it will go, securely holds the gauge in the slot.

Another mode of securing the gauge in the slot is, by making a slot in the gauge or measure, in direction of its length, and securing it by means of a thumb-screw, which passes into the blade through the slot in the gauge, and the slot *a*, as shown in red lines, fig. 2.

The great advantage of my invention is, that persons using my improved scissors are enabled to cut strips or bands of any fabric, paper, &c., of any desired width, even with the edge of the same. The gauge may be graduated by inches, half inches, &c., marks, and the band or strips cut either by inch-measurement, or by setting the gauge to any width desired.

I do not confine myself to any particular construction of the gauge or measure, or to any peculiar mode of fastening or attaching it to the scissor-blade; but

What I claim as new, and desire to secure by Letters Patent, is—

1. The combination, with a pair of scissors, of a gauge or measure, B, substantially as and for the purposes set forth.

2. A pair of scissors, one blade of which is provided with a slot at right angles to the line of its cutting-edge, in combination with a gauge or measure, B, substantially as and for the purposes set forth.

The above specification of my improvement in scissors signed, this 18th day of September, 1868.

SARAH H. BRISBANE.

Witnesses:
S. H. MERCER,
ALEXR. A. C. KLAUCKE.